March 11, 1952     R. B. COTTRELL     2,588,703
DRAFT GEAR

Filed March 1, 1949     2 SHEETS—SHEET 1

INVENTOR.
Robert B. Cottrell
BY O. B. Garner
Atty.

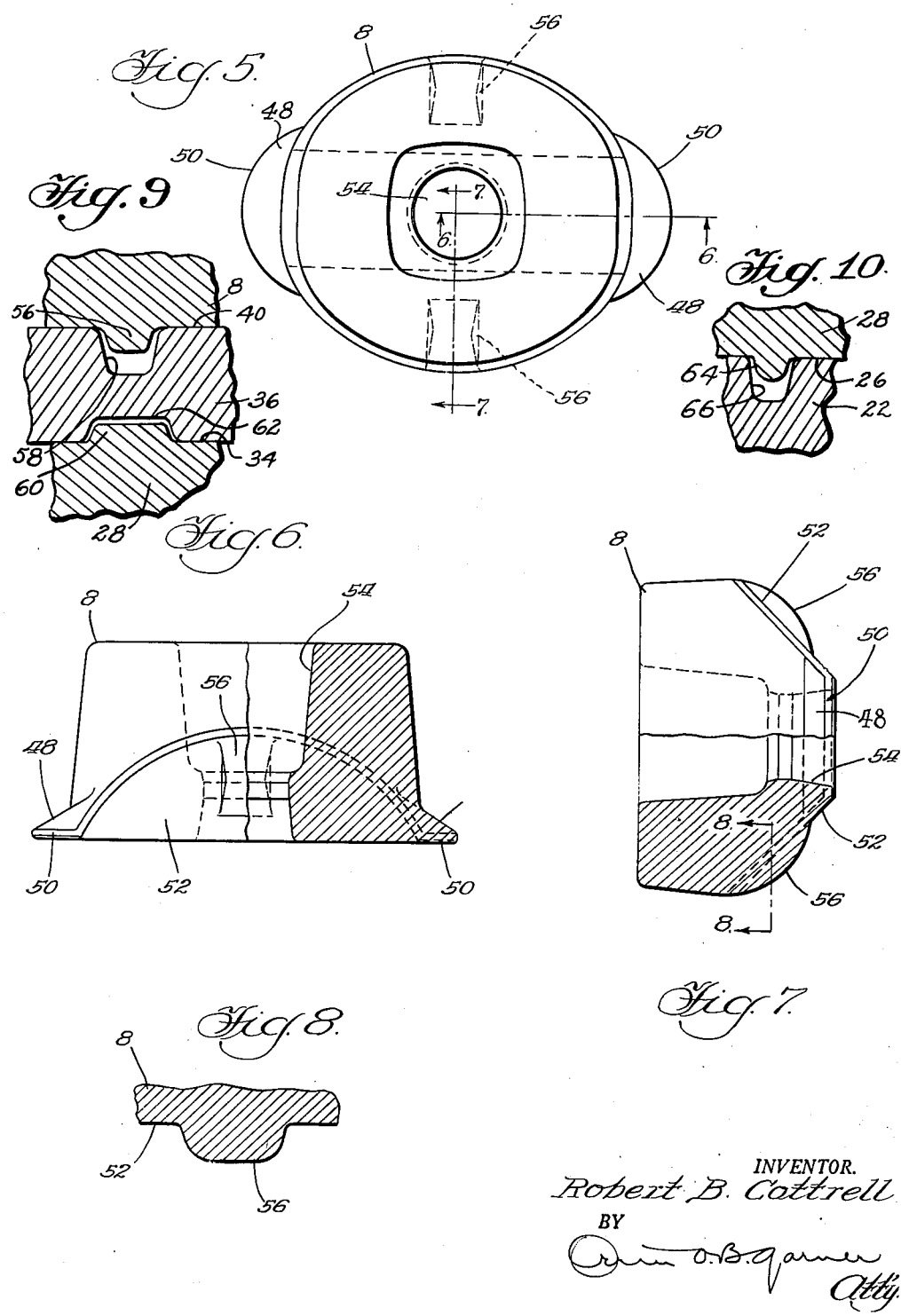

Patented Mar. 11, 1952

2,588,703

UNITED STATES PATENT OFFICE 2,588,703

DRAFT GEAR

Robert B. Cottrell, Chicago, Ill., assignor to American Steel Foundries, Chicago, Ill., a corporation of New Jersey Application March 1, 1949, Serial No. 78,965

5 Claims. (Cl. 213—34)

1

This invention relates to draft gears and more particularly to a novel railway draft gear and method of assembling the same.

A general object of the invention is to devise a novel draft gear wherein the parts are interlocked in assembled position without the use of a special retainer such as a retainer bolt commonly utilized in the prior art.

A more specific object of the invention is to provide a novel bayonet joint or interlock between the outer wedge follower and the housing of the gear.

Another object of the invention is to devise a gear, such as above-described, wherein the clutch mechanism operated by the outer wedge is interlocked with the housing and the wedge against relative rotation in assembled position thereby preventing accidental release of the bayonet interlock between the wedge and the housing.

A further object of the invention is to devise a simple and economical method of assembling a draft gear, such as above described, by sleeving the outer wedge on a pusher bar or rod utilized to compress the clutch mechanism of the gear while the outer wedge is entered into the housing and is rotated to interlocked position therewith whereupon the pusher bar may be removed permitting the clutch mechanism to urge the outer wedge into tight interlock with the housing.

The foregoing and other objects and advantages of the invention will become apparent from a consideration of the following specification and the accompanying drawings, wherein.

Figure 2:
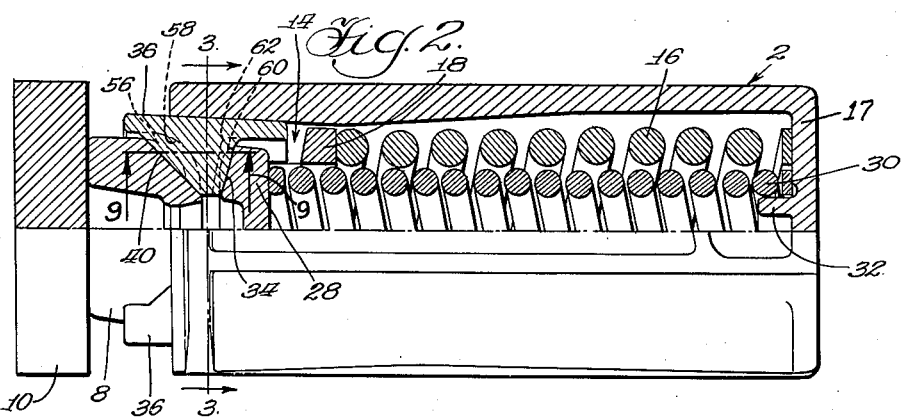
Figure 2 is another side elevational view of the gear taken from the bottom of Figure 1 and partly in section on the line 2—2 thereof.

Figures 5 to 8 inclusive, illustrate in detail the novel outer follower wedge, Figure 5 being a plan view taken from the outer face thereof, Figure 6 being a side elevational view partly in section on the line 6—6 of Figure 5, Figure 7 being a side elevational view taken from the right of Figure 5 and partly in section on the line 7—7 thereof, and Figure 8 being a sectional view on the line 8—8 of Figure 7;

Figure 9 is an enlarged sectional view on the line 9—9 of Figure 2; and

2

Figure 1:
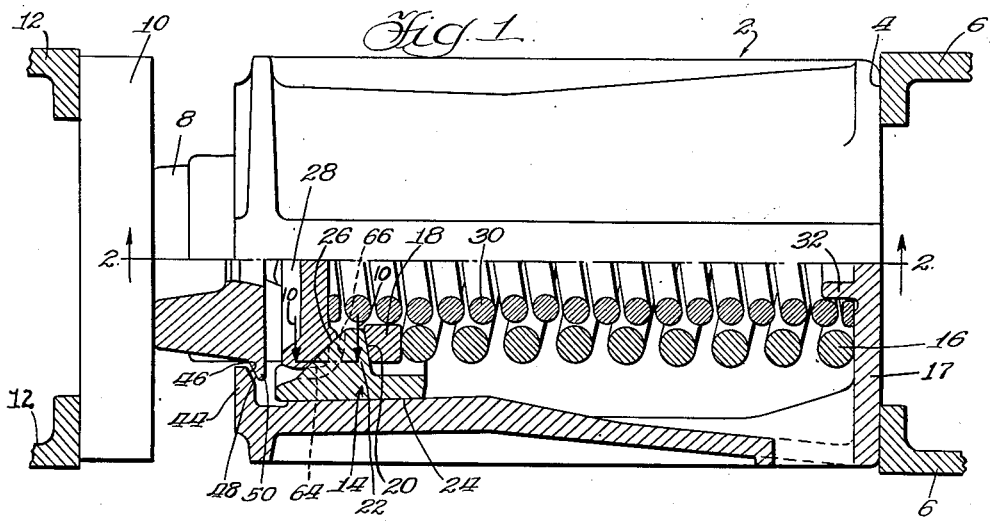
Figure 1 is a side elevational view of the novel gear, partly in section, on the line 1—1 of Figure 3.

Figure 10 is an enlarged sectional view on the line 10—10 of Figure 1.

Figures 3, 4:
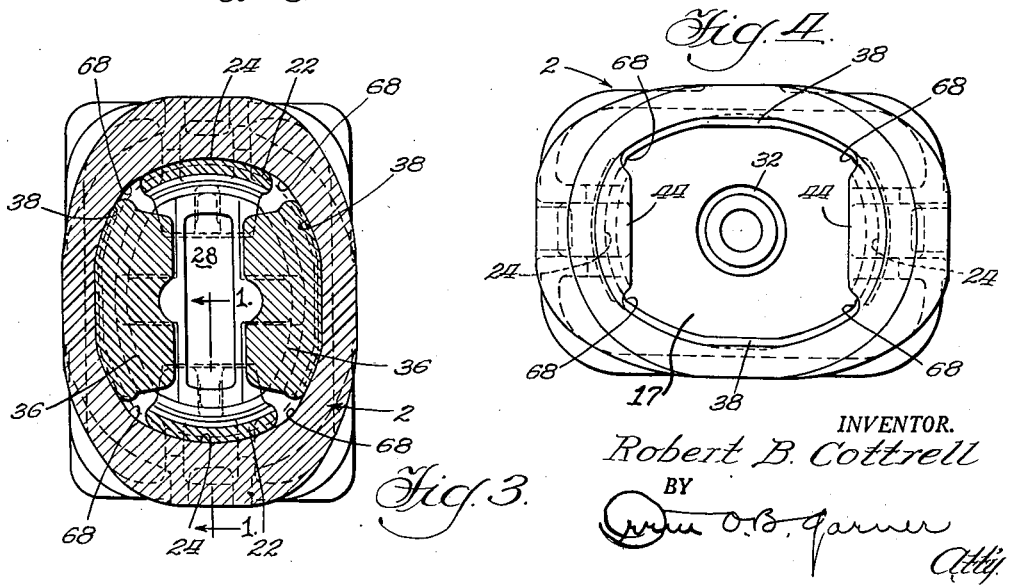
Figure 3 is a sectional view of the draft gear housing and friction shoes on the line 3—3 of Figure 2 with the equalizer shown in plan view.
Figure 4 is a plan view of the housing taken from the open end thereof.

Describing the invention in detail and referring first to the general assembly views of Figures 1 to 3, the novel draft gear comprises a housing, generally designated 2, adapted to seat at 4 against conventional draft lugs 6 of an associated car body (not shown). An outer follower wedge 8 is received within the open end of the housing 2 and is adapted to seat against a front follower block 10 compressed against front draft lugs 12 (Figure 1) of the car body.

The housing 2 contains a clutch mechanism, generally designated 14, said mechanism being identical with that shown and described in my copending application, Serial No. 28,011, filed May 19, 1948, in the United States Patent Office for Draft Gear. The clutch mechanism comprises an outer coil spring 16 seated against a base wall 17 (Figures 1 and 2) of the housing 2 and bearing against a spring cap 18 having complementary wedge engagement at 20 (Figure 1) with each of a pair of inner identical friction shoes 22, said shoes, as best seen in Figure 3, being seated against converging friction surfaces 24 of the housing 2.

The inner shoes 22 are in wedge engagement as at 26 with an equalizer 28, the inner surface of which bears against an inner coil spring 30 sleeved within the spring 16 and positioned by a boss 32 within the housing 2.

As best seen in Figure 2, the equalizer 28 is in wedge engagement as at 34 with each of a pair of outer friction shoes 36 each of which is seated against converging friction surfaces 38 within the housing 2, as seen in Figure 3. Each of the outer shoes 36, as shown in Figure 2, is in wedge engagement as at 40 with the outer follower wedge 8, the front face of which is compressed against the before-mentioned follower block 10.

As best seen in Figures 1 and 4, the housing 2 comprises a pair of stop or limit lugs 44 outwardly of the surfaces 24 and in longitudinal alignment therewith, the inner surface of each lug 44 being formed with a diagonal wedge face 46 adapted to engage a complementary wedge face 48 of a lug 50 formed on the follower wedge 8. It will be noted that the wedge faces 46 and 48 upon release of the gear are effective to center the wedge 8 between the lugs 44, thereby preventing binding or gouging of the parts upon compression of the gear. It will also be noted that the wedge faces 48 are preferably planar as best seen in Figures 6 and 7; and inasmuch as the surfaces 46 are complementary to the surfaces 48, as above described, rotation of the follower wedge 8 about the longitudinal axis of the draft gear is positively restrained when the surfaces 48 of the wedge 8 are engaged with the surfaces 46 of the housing under the action of the springs 16 and 30 upon release or expansion of the draft gear.

The wedge 8 is shown in detail in Figures 5 to 8 and is a generally cup-shaped member having a pair of wedge faces 52 at opposite sides thereof, said wedge having the before-mentioned stop or limit lugs 50 disposed alternately intermediate the wedge faces 52 which are adapted for wedge engagement as at 40 (Figure 2) with the outer shoes 36. The wedge 8 has a central opening 54, serving a purpose hereinafter described in detail in connection with the assembly of the gear, and it may be noted that preferably each wedge face 52 is interrupted by an interlocking lug 56 adapted for reception within a complementary recess 58 (Figures 2 and 9) of the related friction shoe 36 for limiting relative rotational movement therebetween.

Similarly, the equalizer 28 is provided at each side thereof with an interlocking lug 60 receivable within a complementary recess 62 of the related outer shoe 36, as best seen in Figures 2 and 9; and the equalizer also comprises at each end thereof an interlocking lug 64 received within a complementary recess 66 of the related inner shoe 22 as best seen in Figures 1 and 10. Thus by means of the above-described interengagement between the equalizer and both sets of shoes, these parts are all limited against relative rotative movement within the housing 2 and, as best seen in Figure 3, the juncture of each surface 24 with each surface 38 affords shoulders 68 (Figure 4) limiting rotational movement of both sets of shoes within the housing.

Thus in the assembled position of the outer wedge 8 with the lugs 50 thereof inwardly and in alignment with the housing lugs 44 to limit outward movement of the wedge 8, the latter is positively limited against rotational movement within the housing thereby preventing accidental misalignment of the lugs 50 with respect to the lugs 44.

The novel draft gear is assembled by first inserting the outer coil spring 16 within the housing 2 and then inserting the spring cap 18 which rests on the outer spring, as best seen in Figure 1. Pressure is then applied to the spring cap 18 compressing the spring 16 sufficiently to accommodate insertion of the inner set of friction shoes 22 and the pressure is then released so that the shoes are seated against the surface 24 and abut against the inner faces of the housing lugs 44 holding the spring 16 in compression. The coil spring 30 is then inserted and the equalizer 28 is then seated against the outer surface or end of spring 30. The outer follower wedge 8 is then assembled by sleeving a pusher bar or rod (not shown) through the opening 54 and exerting pressure against said rod, thereby compressing the equalizer 28 until the springs 16 and 30 have been compressed sufficiently to accommodate insertion of the outer set of shoes 36. The wedge 8 is then slid along the bar which is still sleeved within the opening 54 and is inserted into the open end of the housing 2 with the lugs 50 in misalignment with the lugs 44, and the wedge 8 is then rotated on the bar to align the lugs 50 with the lugs 44 in the assembled position shown in Figure 1. Pressure on the bar is then released accommodating engagement between the lugs 50 and 44 in what may be described as a bayonet joint or interlock positively limiting outward movement of the wedge 8 from the housing 2 and accommodating movement of the wedge 8 inwardly of the housing to actuate the clutch mechanism 14 in service, as will be readily understood by those skilled in the art.

As shown in Figure 1, when the novel draft gear is in operating position compressed between the follower block 10 and the rear draft lugs 6, the lugs 50 are spaced slightly inwardly of the lugs 44 to prevent excessive wear and hammering therebetween during repeated compression and release of the gear as occurs in railway service. For this reason the above-described means for limiting relative rotative movement between the shoes and the housing and for limiting relative rotative movement between the outer shoes 36 and the wedge 8 have been found to positively prevent accidental rotation or the turning of the wedge 8 within the housing to a position whereat the lugs 50 are misaligned with respect to the lugs 44. It will readily be understood that such accidental rotation of the wedge 8 would result in loss of the clutch parts and possible hazard to personnel upon removal of the gear from the car body.

As above noted, the draft gear housing 2 and the clutch parts are identical with those shown and described in my copending application, above identified, with the exception of the bayonet joint or interlock 44, 50 between the wedge 8 and the housing 2 eliminating the necessity of a special retainer bolt, and it may be further noted that the novel method of assembling the gear eliminates the necessity for special jigs and fixtures for holding the housing 2 and outer wedge 8 while the latter is rotated to the interlocked position shown in Figures 1 and 2.

I claim:

1. A draft gear comprising a housing having an open end and a closed end, a plurality of friction shoes in said housing, outer follower means projecting into said open end in wedge engagement with said shoes, spring means in said housing compressed against said closed end and reacting against said shoes for urging them outwardly of said open end into said engagement with said follower means, whereby said shoes are urged into frictional engagement with said housing, spaced stop surfaces in said housing, spaced stop lugs on said follower means engageable with respective surfaces by the reaction of said spring means against said shoes, said lugs being adapted upon rotation of the follower means on the longitudinal axis of the housing to pass between said surfaces accommodating unrestricted movement of the follower means outwardly from the open end of the housing, said lugs being engageable with the housing surfaces along diagonal converging areas to center the follower means within the housing and to positively restrain rotation of the follower means on said axis.

2. A draft gear comprising a casing having an open end, friction means in said casing frictionally engaged therewith, wedge means in said open end in wedge engagement with said friction means for urging the latter into engagement with the casing, spring means in said casing precompressed between the friction means and the casing for resisting movement of said friction means into the casing, and a bayonet interlock between the casing and said wedge means along a pair of spaced surfaces of the casing at opposite sides of its longitudinal axis, and a pair of spaced surfaces of the wedge means engaged with the respective casing surfaces, the surfaces of each pair converging inwardly toward said axis to center the wedge means in said open end of the casing when the gear is released and said spring means urges the surfaces of said wedge means against the related surfaces of said casing, said wedge means being rotatable on said axis upon disengagement of the surfaces of said wedge means from the surfaces of said casing to accommodate release of said bayonet interlock.

3. A draft gear comprising a housing, a pair of springs therein, a pair of inner shoes operatively connected to one of the springs, an equalizer operatively connected to the other spring, said equalizer being in wedge engagement with the inner shoes, a pair of outer shoes having wedge engagement with the equalizer, an outer wedge follower having wedge engagement with the outer shoes, said follower having spaced stop lugs, spaced stop surfaces within the housing engageable with the lugs for limiting outward movement of the follower under the action of said springs, said lugs being adapted upon rotation of the follower on the longitudinal axis of the housing to pass between said surfaces accommodating unrestricted movement of the follower outwardly of the housing, the follower lugs being engageable with the housing surfaces along diagonal converging areas to center the follower within the housing and prevent rotation of the follower therein.

4. A gear, according to claim 3, wherein both pairs of shoes are in tongue and groove interlocking engagement with the equalizer, the outer pair of shoes being in tongue and groove engagement with the follower, and the housing is provided with means for limiting rotation of said shoes on the longitudinal axis of the housing thereby preventing accidental disassembly of the follower.

5. A draft gear comprising a housing, a plurality of friction shoes therein, an outer follower wedge having wedge engagement with said shoes, said follower wedge having spaced stop lugs, spaced stop surfaces within the housing engageable with said lugs for limiting outward movement of the follower, a spring within the housing, said spring being compressed between the housing and friction shoes for urging the lugs against respective stop surfaces, said lugs and stop surfaces being engaged along diagonal planar areas converging inwardly of the housing to center the wedge within the housing and to restrain rotation of the wedge on the longitudinal axis of the housing, said lugs being adapted, upon disengagement thereof from said stop surfaces and upon rotation of the wedge on said axis, to pass between said surfaces accommodating unrestricted movement of the wedge outwardly of the housing during disassembly of the gear.

ROBERT B. COTTRELL.

REFERENCES CITED

The following references are of record in the file of this patent:

UNITED STATES PATENTS

| Number | Name | Date |
| --- | --- | --- |
| 2,222,479 | Cottrell | Nov. 19, 1940 |
| 2,280,428 | Cottrell | Apr. 21, 1942 |
| 2,335,847 | Dath | Dec. 7, 1943 |
| 2,354,826 | Olander | Aug. 1, 1944 |
| 2,411,956 | Dath | Dec. 3, 1946 |
| 2,426,262 | Dath | Aug. 26, 1947 |
| 2,430,494 | Dath | Nov. 11, 1947 |